United States Patent
Qiu

(10) Patent No.: US 10,165,800 B2
(45) Date of Patent: Jan. 1, 2019

(54) BATTERY DEVICE AND ELECTRONIC CIGARETTE HAVING THE SAME

(71) Applicant: Joyetech Europe Holding GmbH, Zug (CH)

(72) Inventor: Weihua Qiu, Jiangsu (CN)

(73) Assignee: JOYETECH EUROPE HOLDING GMBH, Zug (CH)

( * ) Notice: Subject to any disclaimer, the term of this patent is extended or adjusted under 35 U.S.C. 154(b) by 20 days.

(21) Appl. No.: 15/636,175

(22) Filed: Jun. 28, 2017

(65) Prior Publication Data

US 2018/0013104 A1 Jan. 11, 2018

(30) Foreign Application Priority Data

Jul. 5, 2016 (CN) ...................... 2016 2 0701104 U

(51) Int. Cl.
| | |
|---|---|
| *A24F 47/00* | (2006.01) |
| *H01M 2/02* | (2006.01) |
| *H01M 2/10* | (2006.01) |
| *H01M 2/04* | (2006.01) |

(52) U.S. Cl.
CPC ......... *A24F 47/008* (2013.01); *H01M 2/0245* (2013.01); *H01M 2/04* (2013.01); *H01M 2/0404* (2013.01); *H01M 2/1022* (2013.01); *H01M 2/1055* (2013.01); *H01M 2220/30* (2013.01)

(58) Field of Classification Search
CPC .................................................... A24F 47/008
See application file for complete search history.

(56) References Cited

U.S. PATENT DOCUMENTS

| | | | | |
|---|---|---|---|---|
| 5,080,983 | A * | 1/1992 | Alexon | A61B 17/1628 310/50 |
| 5,608,612 | A * | 3/1997 | Hokao | G06F 1/1626 361/616 |
| 9,570,936 | B2 * | 2/2017 | Yoo | H02J 7/0052 |
| 2005/0146504 | A1* | 7/2005 | Huang | G06F 3/03543 345/163 |
| 2009/0233163 | A1* | 9/2009 | Fang | H01M 2/1022 429/99 |
| 2015/0346766 | A1* | 12/2015 | Justice | G06F 1/163 361/679.03 |
| 2016/0345628 | A1* | 12/2016 | Sabet | A24F 15/18 |
| 2017/0094999 | A1* | 4/2017 | Hearn | A24F 47/008 |
| 2017/0105449 | A1* | 4/2017 | Hearn | A24F 15/18 |

(Continued)

*Primary Examiner* — James Harvey
(74) *Attorney, Agent, or Firm* — Novick, Kim & Lee, PLLC; Allen Xue

(57) ABSTRACT

A battery device includes a main body and a rear cover removably connected to the main body. The main body has a first battery receiving compartment. The rear cover has a second battery receiving compartment. The first battery receiving compartment is configured to receive at least two batteries while the second battery receiving compartment is configured to receive at least one battery. For the battery device, since the back cover is provided with the second battery receiving compartment cooperating with the first battery receiving compartment in the body, the apparatus applying the battery device has at least two supportable power levels. In this way, the battery device can be switched between a low power and a high power, eliminating the need of another battery device.

9 Claims, 8 Drawing Sheets

(56) References Cited

U.S. PATENT DOCUMENTS

| | | | |
|---|---|---|---|
| 2017/0182649 A1* | 6/2017 | Ito | H02J 7/00 |
| 2017/0273358 A1* | 9/2017 | Batista | A24F 47/008 |
| 2018/0013104 A1* | 1/2018 | Qiu | A24F 47/008 |
| 2018/0035720 A1* | 2/2018 | Qiu | H05B 3/44 |

* cited by examiner

BATTERY DEVICE AND ELECTRONIC CIGARETTE HAVING THE SAME

TECHNICAL FIELD

The present disclosure relates to the technical field of smoking simulation, and more particularly, to a battery device and an electronic cigarette having the same.

BACKGROUND

The electronic cigarette is generally used for quitting smoking or replacing a traditional cigarette. The electronic cigarette generally has an appearance and taste similar to the traditional cigarette, and even has more flavor options than the traditional cigarette. Just like the traditional cigarette, the electronic cigarette would release vapor in use, and the user would have a feel of snorting the traditional cigarette identical to the physiological and psychological needs. The electronic cigarette has no harmful ingredient such as tar and particulate matters in the traditional cigarette, so the electronic cigarette has gradually replaced the traditional cigarette on the market. In the exiting electronic cigarette, the heating unit in the atomizer is generally powered by a battery, and the heating unit is energized by the battery to heat the nicotine liquid to create a vapor, enabling the user to have a smoking experience.

As shown in FIG. 1, the battery devices for the exiting electronic cigarette are similar, including a main body 100 provided with a battery compartment for receiving two batteries, and a cover plate 200. The battery compartment is set according to a supportable maximum power of the battery device. If the electronic cigarette needs two batteries to supply power, a mould for the two batteries should be made, and a corresponding battery device should be manufactured based on the mould. The traditional battery device only supports one maximum power. In this case, if the user needs to use a higher power which is unavailable for the current battery device, the user must buy another battery device supporting a higher power than the current battery device. This will result in waste of resources, and aggravate the user's financial burden.

SUMMARY

In view of the above mentioned facts, in order to meet the requirements of the market, an objective of the present disclosure is to provide a battery device, which can change its supportable maximum power, for example, the battery device can use both two batteries and three batteries. The battery device can meet the requirement on the power of the battery of the electronic cigarette.

According to an aspect of the present disclosure, a battery device is provided, including a main body, and a rear cover removably connected to the main body, wherein the main body is provided with a first battery receiving compartment, the rear cover is provided with a second battery receiving compartment, the first battery receiving compartment is adapted to receive at least two batteries, and the second battery receiving compartment is adapted to receive at least one battery.

Further, both upper and lower sides of the first battery receiving compartment are provided with a flexible conduction post respectively, an upper side of the second battery receiving compartment is provided with a positive connection post adapted to be electrically connected to one of the two flexible conduction posts, and a lower side of the second battery receiving compartment is provided with a negative connection post adapted to be electrically connected to the other flexible conduction post.

Further, the rear cover includes a cover body and an upper plastic fastener arranged inside the cover body, the cover body is provided with a stud inside the second battery receiving compartment and close to an upper side of the cover body, the upper plastic fastener includes an upper horizontal part and an upper vertical part extending from one side of the upper horizontal part and bending vertically upwards, the upper vertical part is provided with an opening, and the positive connection post is fastened to the stud through the opening so that the upper plastic fastener is fastened to the cover body.

Further, the rear cover includes an upper plastic compression element, there is a gap between the stud and a top wall of the second battery receiving compartment, and the upper plastic compression element is fastened in the gap between the stud and the top wall of the second battery receiving compartment and to support against the upper vertical part.

Further, the upper horizontal part is provided with a through hole, the rear cover includes a positive seat having an electrode post, and the electrode post of the positive seat passes through the through hole of the upper horizontal part, and is connected to the positive connection post passing through the opening of the upper vertical part.

Further, an upper side of the first battery receiving compartment is provided with a first fastening hole, a lower side of the first battery receiving compartment is provided with a second fastening hole, an upper side of the second battery receiving compartment is provided with a first fastener adapted to be engaged with the first fastening hole, and a lower side of the second battery receiving compartment is provided with a second fastener adapted to be engaged with the second fastening hole.

Further, the top of the main body is provided with a connector adapted to be connected to an atomizer.

Further, the bottom of the main body is provided with a lock catch.

Further, the first battery receiving compartment is designed to receive two batteries, and the second battery receiving compartment is designed to receive one battery.

According to another aspect of the present disclosure, an electronic cigarette is provided, including an atomizer, and the above battery device electrically connected to the atomizer.

For the battery device according to the present disclosure, the back cover is provided with the second battery receiving compartment, and the second battery receiving compartment can cooperate with the first battery receiving compartment in the main body, so the apparatus applying the battery device can be used in at least two supportable maximum powers. In addition, the main body of the battery device can cooperate with the exiting cover plate. For example, when one supportable maximum power of the battery device is required, the main body may be covered by the exiting cover plate, or when a higher supportable maximum power is required, the main body may be covered by the back cover with the second battery receiving compartment. In this way, the battery device can be switched between a low power and a high power, enabling the user to avoid re-buying another battery device, to reduce the user's financial burden.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF PREFERRED EMBODIMENTS

The advantages and features of the present disclosure will become apparent by referring to embodiments of the present disclosure as described below in detail in conjunction with the accompanying drawings. However, the present disclosure is not limited to the embodiments set forth below, but may be implemented in various different forms, as one of ordinary skill in the art would know. The following embodiments are provided only to inform those skilled in the art of the scope of the present disclosure, and the present disclosure is limited only by the scope of the appended claims.

Figure 5:
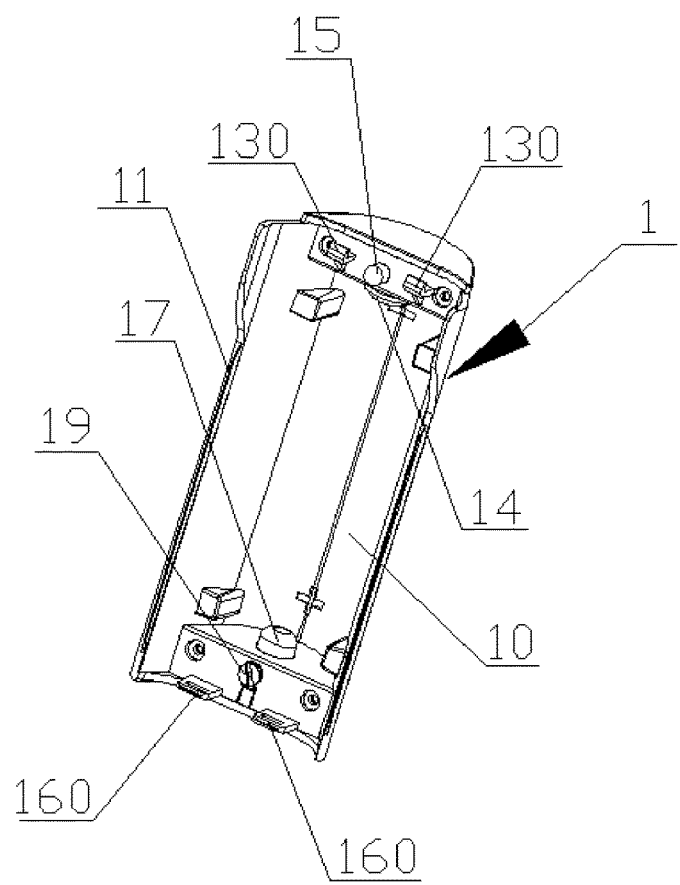
FIG. 5 is a perspective view diagram showing the assembled rear cover in FIG. 4.
Figure 6:
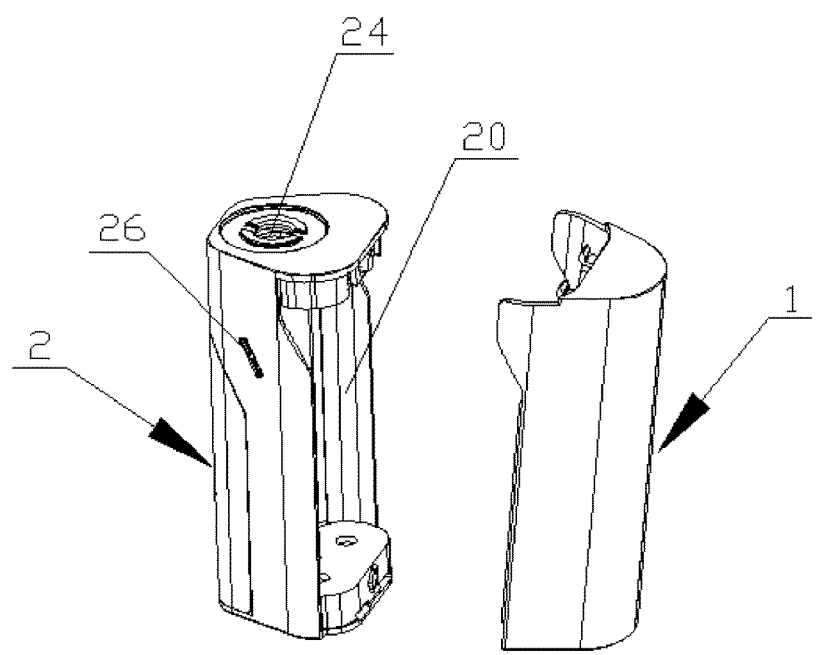
FIG. 6 is an exploded diagram of a battery device according to one embodiment of the present disclosure.

With reference to FIG. 6, the battery device includes a main body 2, and a rear cover 1 removably connected to the main body 2. The main body 2 is provided with a first battery receiving compartment 20 adapted to receive two or more batteries. The number of the batteries received in the first battery receiving compartment 20 can be determined according to design needs. The rear cover 1 is provided with a second battery receiving compartment 10 (see FIG. 5) adapted to receive one or more batteries, so that the battery device may receive three or more batteries when the rear cover 1 closes on the main body 2.

Figure 1:
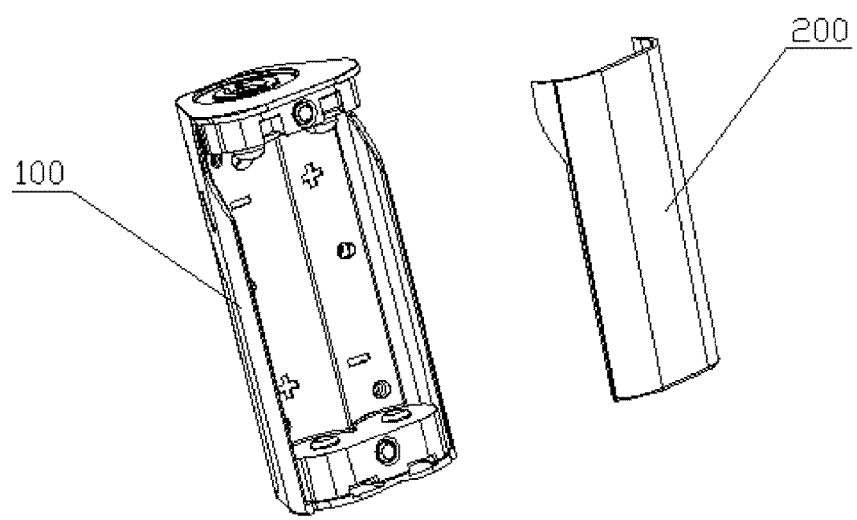
FIG. 1 is a structural schematic diagram showing an existing battery device.
Figure 2:
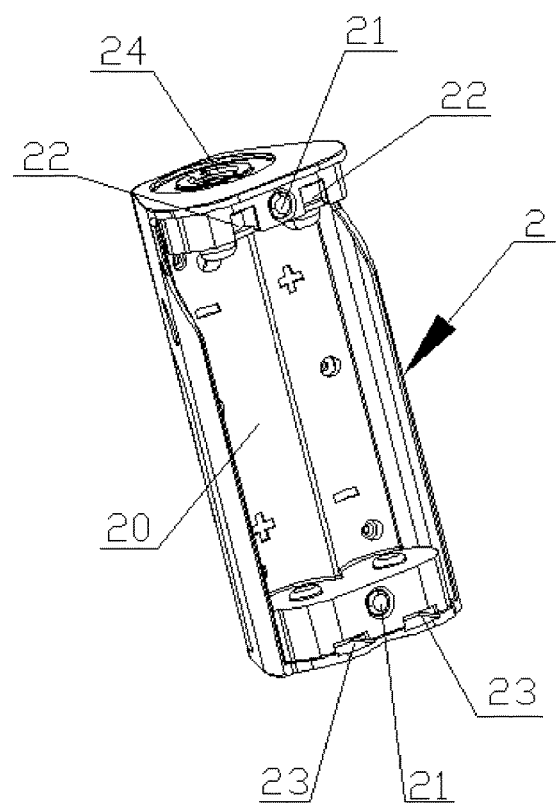
FIG. 2 is a perspective view diagram showing a main body of a battery device according to one embodiment of the present disclosure.
Figure 3:
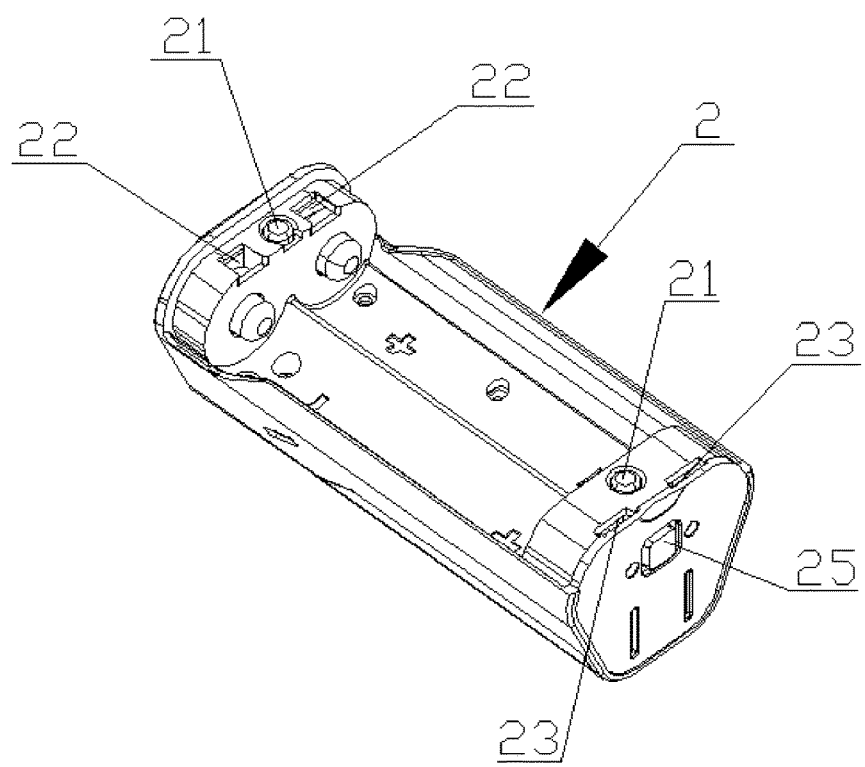
FIG. 3 is another perspective view diagram showing the main body in FIG. 2.

In one embodiment, the first battery receiving compartment 20 may be designed to receive two batteries. It should be understood that, the first battery receiving compartment 20 may be designed to receive more than two batteries in other embodiments. The main body 100 in FIG. 1 may be used for the main body 2 in this embodiment. As shown in FIGS. 2 and 3, both upper and lower sides of the first battery receiving compartment 20 are provided with one flexible conduction post 21 respectively. Both sides of the flexible conduction post 21 on the upper side of the first battery receiving compartment 20 is provided with a first fastening hole 22 respectively, and both sides of the flexible conduction post 21 on the lower side of the first battery receiving compartment 20 is provided with a second fastening hole 23 respectively. In addition, the top of the main body 2 is provided with a threaded connector 24 adapted to be connected to an atomizer (not shown) or other electric devices. The bottom of the main body 2 is provided with a lock catch 25.

Figure 4:
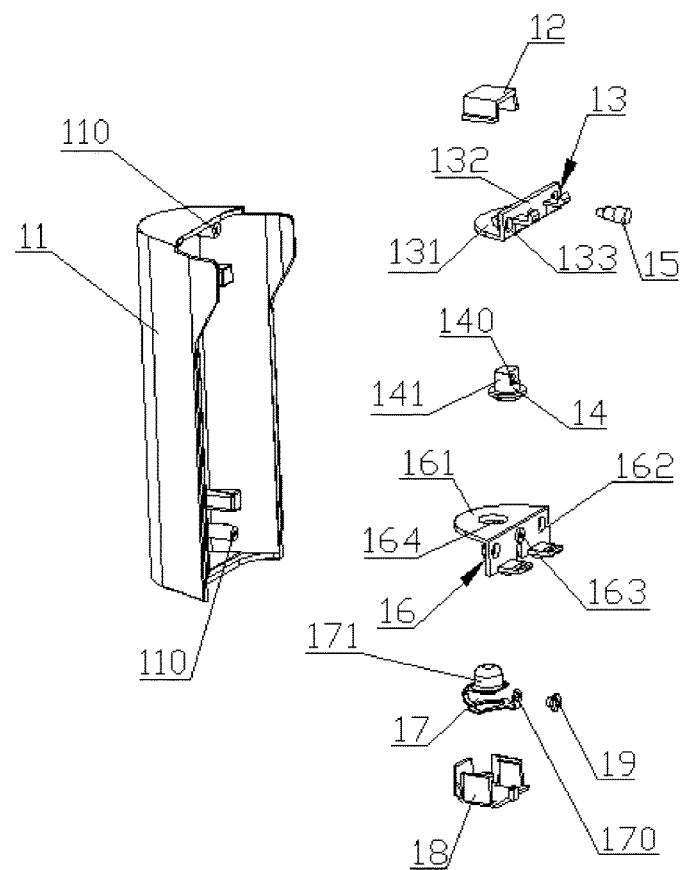
FIG. 4 is an exploded diagram of a rear cover of a battery device according to one embodiment of the present disclosure.

With reference to FIG. 4, in one embodiment, the rear cover 1 includes a cover body 11, and an upper plastic compression element 12, an upper plastic fastener 13, a positive seat 14, a positive connection post 15, a lower plastic fastener, a negative seat 17, a lower plastic compression element 18 and a negative connection post 19 arranged inside the cover body 11. The second battery receiving compartment 10 is formed in the cover body 11, and a top wall, a bottom wall and a peripheral wall enclosing the second battery receiving compartment 10 are formed in the cover body 11 accordingly. The second battery receiving compartment 10 is not closed, and one side of the second battery receiving compartment 10 is open for putting the battery in the second battery receiving compartment 10. The cover body 11 is provided with a hollow stub 110 inside the second battery receiving compartment 10 and close to an upper side of the cover body 11, and there is a gap between the stub 110 and the top wall of the cover body 11. The upper plastic compression element 12 is fastened inside the second battery receiving compartment 10 of the cover body 11 and on the top of the second battery receiving compartment 10, and adapted to abut against the upper plastic fastener 13 to make the upper plastic fastener 13 have a reliable installation. Specifically, the upper plastic compression element 12 is in the shape of "Π", sleeved on the stub 110, and fastened in the gap between the stud 10 and the top wall of the second battery receiving compartment 10.

The upper plastic fastener 13 includes an upper horizontal part 131 and an upper vertical part 132 extending from one side of the upper horizontal part 131 and bending vertically upwards. The upper vertical part 132 extending opposite to the surface of one side of the upper horizontal part 131 to form two first fasteners 130 (see FIG. 5). The upper horizontal part 131 is provided with a through hole (not shown) in the middle of the upper horizontal part 131, and the electrode post of the positive post 14 is adapted to pass through the through hole. The upper vertical part is provided with an opening (not shown) between the two first fasteners 130. The positive connection post 15 is fastened to the electrode post of the positive post 14 through the opening between the two first fasteners 130. Since both the positive connection post 15 and the positive post 14 are made of a conducting material, the positive connection post 15 and the positive post 14 are electrically connected to each other. The side portion of each first fastener 130 of the upper vertical part 132 is provided with a bolt mounting pole 133. The number of the bolt mounting pole 133 match the number of the stub 110. After the upper plastic fastener 13, the positive seat 14 and the positive connection post 5 have been assembled, the upper plastic compression element 12 and the upper plastic fastener 13 may be fastened to the cover body 11 by passing the bolt through the bolt mounting pole 133 and screwing the bolt into the hollow stub 110. The upper plastic compression element 12 may support against the upper vertical part 132 of the upper plastic fastener 13, to strengthen the stability of the upper plastic fastener 13. One end of the electrode post 141 of the positive seat 14 may pass through the through hole of the upper horizontal part 131. The electrode post 141 of the positive seat 14 is provided with a driving hole 140. One end of the positive connection post 15 may pass through the driving hole 140, to achieve the electrical connection between the positive connection post 15 and the positive seat 14.

Similarly, with reference to FIGS. 4 and 5, in one embodiment, the cover body 11 is provided with a hollow stub 110 inside the second battery receiving compartment 10 and close to a lower side of the cover body 11, and there is a gap between the stub 110 and the top wall of the cover body 11. The lower plastic compression element 18 is fastened in the gap between the stub 110 and the bottom wall of the cover body 11, and adapted to support against the lower plastic fastener 16, to make the lower plastic fastener 16 have a reliable installation. The lower plastic fastener 16 includes a lower horizontal part 161, and a lower vertical part 162 extending from one side of the lower horizontal part 161 and bending vertically upwards. The lower vertical part 162 extending opposite to the surface of one side of the lower horizontal part 631 to form two second fasteners 160. The lower vertical part 162 is provided with an opening above the middle of the two second fasteners 160. The negative connection post 19 is adapted to pass through the opening above the middle of the two second fasteners 160, and fastened in to stub 10, so that the lower plastic compression element 18 and the lower plastic fastener 16 are fastened inside and at the bottom of the second battery receiving compartment 10. The lower horizontal part 161 is provided with a through hole 164, and the electrode post 171 of the negative seat 17 is adapted to pass through the through hole. The negative seat 17 is provided with a driving hole 170, and the negative connection post 19 is adapted to pass through the driving hole 170, to achieve the electrical connection between the negative connection post 19 and the negative seat 17. It should be understood that, the upper plastic compression element 12, the upper plastic fastener 13, the positive seat 14 and the positive connection post 15 can be regarded as positive connection components, and the lower plastic compression element 18, the upper plastic fastener 16, the negative seat 17 and the negative connection post 19 can be regarded as negative connection components. The assembly method of the negative connection components is the same as that of the positive connection components.

Figure 7:
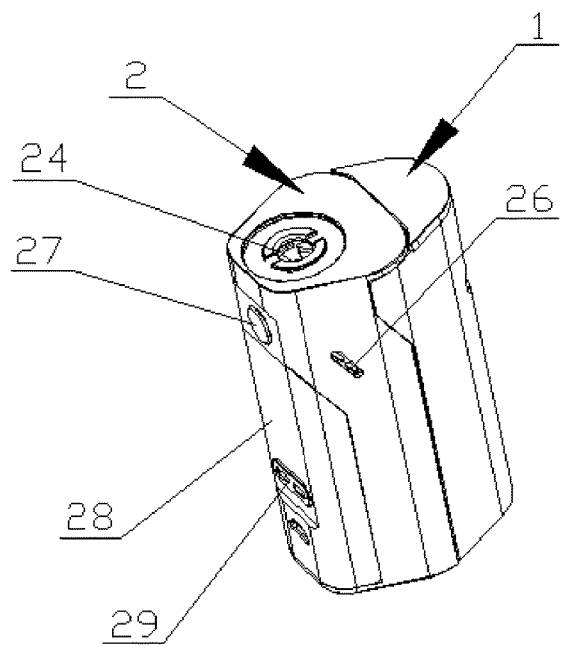
FIG. 7 is a perspective view diagram showing the assembled battery device in FIG. 6.

With reference to FIG. 7, the outer circumferential surface of the main body 2 is provided with a ventilation hole 26 for cooling the battery. The outer circumferential surface of the main body 2 is further provided with a LED screen 28, a power control switch 27 and a control button 29. The power control switch 27 is adapted to turn on and turn off the battery device. The LED screen 28 is adapted to display, for example, the battery level, the current power, the current time, and the usage counter, and to prompt the user to replace the battery. The control button 29 is adapted to control the temperature, power and mode of the battery device.

Figure 8:
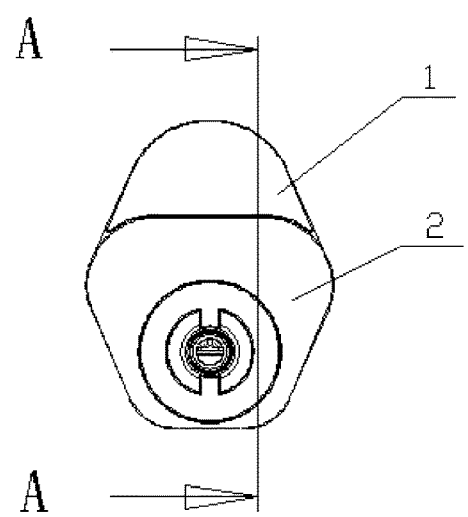
FIG.8 is a top view of the assembled battery device in FIG.7.
Figure 9:
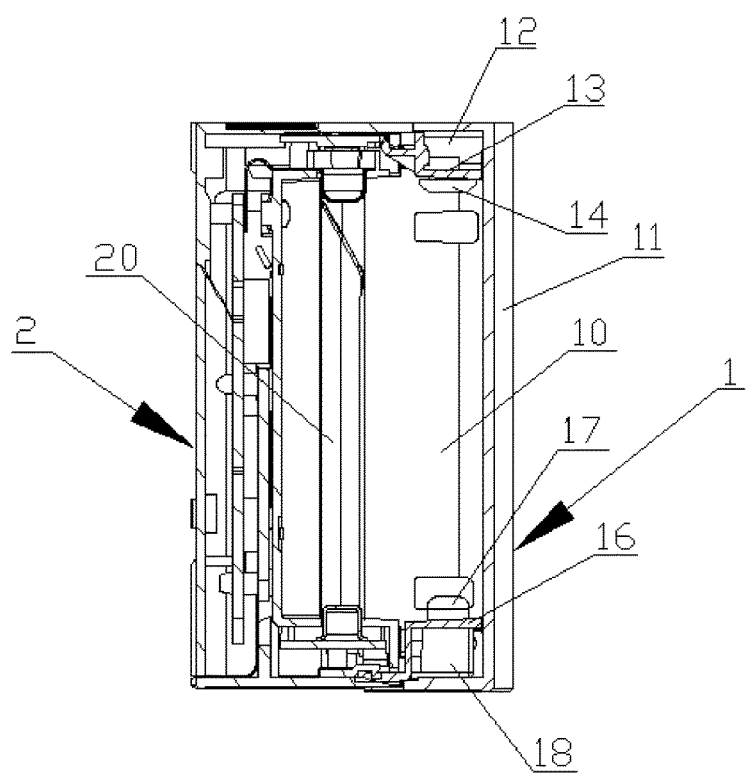
FIG. 9 is a sectional view of FIG. 8 along Line A-A.

With reference to FIGS. 8 and 9, the battery device in this embodiment can be applied to the atomizer or other electric devices powered by three batteries. When the main body 2 is engaged with the back cover 1, the two first fasteners 130 are inserted into the two first fastening holes 22 respectively, and the two second fasteners 160 match the two fastening holes 22 respectively, so that the positive connection post 15 and the negative connection post 19 are electrically connected to the two flexible conduction posts 21 respectively. At this moment, the battery device includes a first battery receiving compartment 20 capable of receiving two batteries formed on the main body 2, and a second battery receiving compartment 10 capable of receiving one battery formed on the back cover 1. When it needs to switch power, for example, to be applied to an atomizer powered by two batteries, the back cover 1 will be removed from the main body 2. The back cover 1 may be disengaged from the main body 2 by the user pressing the lock catch 25 on the bottom of the main body 2, and be convenient to remove. Then a traditional cover plate 200 may be cover on the main body 2. At this moment, the battery device only includes the first battery receiving compartment 20 receiving two batteries. In this way, the battery device is switched from a first maximum power to a second maximum power, enabling the user to avoid purchasing another battery device, to reduce the user's financial burden.

In addition, an electronic cigarette including the above battery device is provided. The electronic cigarette further includes an atomizer electrically connected to battery device. When the electronic cigarette is in use, the battery device may supply power to the atomizer, and the user may inhale with a mouthpiece.

For the battery device according to the present disclosure, the back cover 1 is provided with the second battery receiving compartment 10, and the second battery receiving compartment 10 can be combined the first battery receiving compartment 20 in the main body, so the battery device can meet the use of an electronic cigarette with a high power. In addition, the main body 2 of the battery device can receive with the traditional cover plate 200. For example, when the atomizer needs a battery device of a second maximum power, the main body 2 may receive and be covered by the traditional cover plate 200, or the atomizer needs a battery device of a first maximum power, the main body 2 may receive and be covered by the back cover 1 having the second battery receiving compartment 10. In this way, the battery device can be switched between the first power and the second power, enabling the user to avoid purchasing another battery device, to reduce the user's financial burden.

The above are preferred embodiments of the present disclosure described in detail, and should not be deemed as limitations to the scope of the present disclosure. It should be noted that variations and improvements will become apparent to those skilled in the art to which the present disclosure pertains without departing from its spirit and scope. Therefore, the scope of the present disclosure is defined by the appended claims.

What is claimed is:

1. A battery device, comprising: a main body, and a rear cover removably connected to the main body, wherein the main body is provided with a first battery receiving compartment, the rear cover is provided with a second battery receiving compartment, the first battery receiving compartment is adapted to receive at least two batteries, and the second battery receiving compartment is adapted to receive at least one battery.

2. The battery device according to claim 1, wherein both upper and lower sides of the first battery receiving compartment are provided with a flexible conduction post respectively, an upper side of the second battery receiving compartment is provided with a positive connection post adapted to be electrically connected to one of the two flexible conduction posts, and a lower side of the second battery receiving compartment is provided with a negative connection post adapted to be electrically connected to the other flexible conduction post.

3. The battery device according to claim 2, wherein the rear cover includes a cover body and an upper plastic fastener arranged inside the cover body, the cover body is provided with a stud inside the second battery receiving compartment and close to an upper side of the cover body, the upper plastic fastener includes an upper horizontal part and an upper vertical part extending from one side of the upper horizontal part and bending vertically upwards, the upper vertical part is provided with an opening, and the positive connection post is fastened to the stud through the opening so that the upper plastic fastener is fastened to the cover body.

4. The battery device according to claim 3, wherein the rear cover includes an upper plastic compression element, a gap is formed between the stud and a top wall of the second battery receiving compartment, and the upper plastic compression element is fastened in the gap between the stud and the top wall of the second battery receiving compartment to support against the upper vertical part.

5. The battery device according to claim 3, wherein the upper horizontal part is provided with a through hole, the rear cover includes a positive seat having an electrode post, the electrode post of the positive seat passes through the through hole of the upper horizontal part, and is connected to the positive connection post passing through the opening of the upper vertical part.

6. The battery device according to claim 1, wherein an upper side of the first battery receiving compartment is provided with a first fastening hole, a lower side of the first battery receiving compartment is provided with a second fastening hole, an upper side of the second battery receiving compartment is provided with a first fastener adapted to be engaged with the first fastening hole, and a lower side of the second battery receiving compartment is provided with a second fastener adapted to be engaged with the second fastening hole.

7. The battery device according to claim 1, wherein the top of the main body is provided with a connector adapted to be connected to an atomizer.

8. The battery device according to claim 1, wherein the bottom of the main body is provided with a lock catch.

9. An electronic cigarette, comprising an atomizer, and the battery device according to claim 1 electrically connected to the atomizer.

* * * * *